United States Patent
Carroll

[15] 3,686,290
[45] Aug. 22, 1972

[54] PROCESSES FOR PREPARING OLEFINIC ORGANO-PHOSPHORUS COMPOUNDS

[72] Inventor: Robert L. Carroll, 5009 New Kent Rd., Richmond, Va. 23225

[22] Filed: May 29, 1969

[21] Appl. No.: 829,121

[52] U.S. Cl. ............... 260/502.4 P, 23/165, 210/58, 260/501.19, 260/501.21
[51] Int. Cl. .................... C07f 9/38, C02b 1/22
[58] Field of Search ........................ 260/502.4 P

[56] References Cited

UNITED STATES PATENTS

| | | | |
|---|---|---|---|
| 2,347,669 | 5/1944 | Dennis | 202/64 |
| 2,366,497 | 1/1945 | Dawson | 260/682 |
| 3,062,792 | 11/1962 | McConnell et al. | 260/932 |
| 3,214,454 | 10/1965 | Blauer et al. | 260/502.4 A |
| 3,244,766 | 4/1966 | Keough | 260/682 |
| 3,297,578 | 1/1967 | Grutchfield et al. | 252/106 |
| 3,527,795 | 9/1970 | Rose | 260/502.4 P |

*Primary Examiner*—Leon Zitver
*Assistant Examiner*—Joseph E. Evans
*Attorney*—Richard W. Sternberg, Roger R. Jones and James J. Mullen

[57] ABSTRACT

A method for preparing vinylidene diphosphonate salt which comprises the steps of heating a salt of 1-hydroxy, 1-ethylidene diphosphonic acid, which is prepared by reacting the corresponding free acid with an alkaline material such as sodium hydroxide, the mole ratio of the alkaline material to said acid being at least about 3:1, in a reaction zone which is maintained at a temperature between the range of from 300° C to 500° C for a sufficient period of time to form such vinylidene diphosphonate salt.

4 Claims, No Drawings

PROCESSES FOR PREPARING OLEFINIC ORGANO-PHOSPHORUS COMPOUNDS

The present invention relates to processes for preparing olefinic organo-phosphorus compounds and more particularly relates to processes for preparing vinylidene diphosphonate salts.

In accordance with the present invention it has been unexpectedly ascertained and discovered that the pyrolysis, i.e., heating, of a salt of an acid having the formula (I) 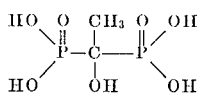

at an elevated temperature in a reaction zone for a sufficient period of time results in the formation of vinylidene diphosphonate salt. The formation of this vinylidene diphosphonate salt was completely unexpected in view of the fact that related organo-phosphorus compounds, upon heating at elevated temperatures, either undergo decomposition or form a variety of polymers.

The aforementioned novel concept is illustrated in the following reaction:

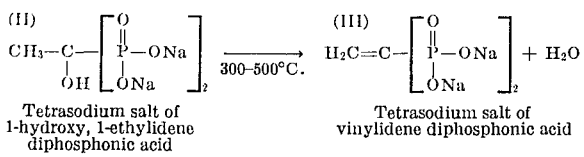

Tetrasodium salt of 1-hydroxy, 1-ethylidene diphosphonic acid

Tetrasodium salt of vinylidene diphosphonic acid

In the new processes as described herein, certain variables are critical and are necessary in order to form vinylidene diphosphonate. Such variables include the reaction temperature and the physical and chemical form of the salt of the acid falling within formula I, both of which will be discussed hereinafter.

The acid form of the starting material utilized in the novel processes of the present invention is 1-hydroxy, 1-ethylidene diphosphonic acid (herein referred to as HEDP) and which has the formula (I) as shown above. This acid, HEDP, is well known in the art and may be prepared by a variety of processes as exemplified by U.S. Pat. Nos. 3,366,675; 3,366,676; 3,366,677; 3,400,147; 3,400,148; 3,400,149; and 3,400,150, all of which patents are incorporated herein by reference. It is to be understood, of course, that HEDP can be prepared by other methods and that the aforementioned patents are merely set forth for exemplary purposes.

It is a critical feature of the present invention that the starting material utilized in the processes of the present invention be a salt of HEDP. This salt is formed by reacting an alkaline material with the corresponding acid, i.e., HEDP per se. There are a variety of alkaline materials which can be utilized to form the salt of HEDP and some of which include alkali metal and alkaline earth metal hydroxides, oxides, halides, and carbonates. The alkali metal ions include sodium, potassium, lithium, rubidium, cesium and francium. The alkaline earth metal ions include barium, strontium, calcium and magnesium. In view of their relative inexpensiveness, the sodium and potassium ions are preferred, and as such, are usually utilized in the form of a sodium hydroxide and potassium hydroxide. Furthermore, the alkaline material can be ammonia and an amine. In particular, amines having a low molecular weight such as below about 300, and more particularly the alkyl amines, alkylene amines, and alkanol amines containing not more than 2 amine groups, such as, ethylamine, diethylamine, propylamine, propylenediamine, hexylamine, 2-ethyl hexylamine, N-butylethanol amine, triethanol amine and the like, are the preferred amines. The aforegoing alkaline materials are merely exemplary and any organic or inorganic material which is a strong enough base to neutralize HEDP is within the scope of the present invention, with the proviso that anionic portion of such organic or inorganic alkaline material does not substantially prevent the HEDP salt from forming the ethylene diphosphonate via pyrolysis.

In conjunction with the preparation of the salt of HEDP, it is a critical feature that the molar ratio of the aforementioned alkaline material to the acid, that is, HEDP, must be at least 3:1. However, the upper limit of the molar ratio is not critical and can be as high as 10:1 or higher if one so desires, as long as the excess alkaline material is not substantially detrimental. However, it is desirable that the molar ratio be within the range of from about 3:1 to about 5:1, preferably from about 4.0:1 to about 4.5:1. It has been found during the experimentation of the present invention processes that the utilization of less than the molar ratio of 3:1, for example 2:1, of alkaline material to HEDP results predominantly in destructive decomposition rather than the formation of ethylene diphosphonate. Furthermore, it was also determined during the experimentation that HEDP per se, that is, the acid form thereof, upon being subjected to pyrolysis, does not yield ethylene diphosphonate but totally decomposes with the evolution of phosphine and other undesired products. These particular facets will be more specifically set forth in the examples hereinafter described.

In conjunction with the above-described formation of the salt of HEDP by reacting the corresponding acid, i.e., HEDP per se, with the aforementioned alkaline material, it is desirable that this reaction take place in a reaction medium such as water or an organic solvent such as a lower alcohol or ketone, for example methanol, ethanol, propanol, acetone and methyl ethyl ketone. Subsequently, the reaction medium is separated from the salt by any conventional means such as evaporation.

In conjunction with the definition of "salt of HEDP", this includes the partially neutralized HEDP (e.g., molar ratio of 3:1), the fully neutralized HEDP (i.e., molar ratio of 4:1) and the fully neutralized HEDP plus excess alkaline material (e.g., molar ratio of 4.5:1). It is to be understood then that when the molar ratio of the alkaline material to HEDP is greater than 4:1 the excess alkaline material is included as part of the salt of HEDP.

The pyrolysis (also called herein the "heating") step in the processes of the present invention is also a critical one and must be conducted at a temperature of from about 300° C to about 500° C. (It is desirable that the temperature be maintained substantially constant throughout the period that the salt of HEDP is undergoing pyrolysis to vinylidene diphosphonate salt.) It is preferred that the heating step be conducted at a temperature range of from about 300° C to about 450° C, more preferably from about 350° C to about 425° C. It is to be understood that this temperature is the temperature of the particles of the salt of HEDP. At temperatures of less than 300° C the salt of HEDP does not undergo pyrolysis and thus does not convert to vinylidene diphosphonate salt. At temperatures above about 500° C, the salt of HEDP decomposes. Thus it is quite apparent that the temperature range of 300° C to 500° C is critical in the formation of the vinylidene diphosphonate salt from the salt of HEDP.

In conjunction with this heating step, and in order to maintain a substantially constant temperature of the salt of HEDP undergoing pyrolysis, it is desirable that the particles of the salt of HEDP be at least intermittently agitated, preferably continuously agitated. As a preferred embodiment of the present invention, the utilization of a moving or fluidized bed is most desirable. Any conventional means for promoting a fluidized bed is within the scope of the present invention. For exemplary purposes, U.S. Pat. Nos. 3,376,124 and 3,429,654 demonstrate typical apparatus and methods; both of these patents are to be considered as incorporated herein by reference.

It is desirable that during pyrolysis in a reaction zone, said zone contain an inert atmosphere over and/or surrounding the particles of the salt of HEDP, since it was found during experimentation in the processes of the present invention that in the presence of oxygen some of the resultant salt particles of the vinylidene diphosphonate have discoloration characteristics. While nitrogen is one of the most common inert gases and which may be utilized, it is to be understood that it is within the scope of the present invention that any other inert gas such as argon, neon and helium may be utilized as long as the gas does not substantially interfere with the pyrolysis taking place in the reaction vessel. However, where this discoloration of the vinylidene diphosphonate salt particles is not objectionable, an air atmosphere may be utilized. In the event that one desires to use air, it is also within the scope of the present invention that the resultant vinylidene diphosphonate salt can be dissolved in water and treated with carbon to remove the color-causing impurities, by processes such as those described in U.S. Pat. Nos. 3,354,158 and 3,357,974, both of which are incorporated herein by reference.

It is within the scope of the present invention that the novel processes described herein can be conducted at super-atmospheric pressure, such as from about 1 to about 10 atmospheres or higher, atmospheric pressure, or sub-atmospheric pressure, i.e., under vacuum, such as from 9/10 to 1/10 atmospheres or lower if one so desires.

The period of time during which pyrolysis takes place is dependent upon a variety of variables and may be as short as 15 to 30 minutes and as long as 6 to 10 hours or even more. It is to be understood, however, that this length of time for pyrolysis is not a limitation herein.

The following examples are illustrative of the embodiments of the present invention; all parts are by weight unless otherwise specified.

EXAMPLE I

Approximately 1 gram mole of HEDP is reacted with 4.3 gram moles of sodium hydroxide contained in a 50 percent by weight NaOH solution in a reaction vessel at room temperature. The resultant sodium salt solution of HEDP is then filtered and dried on a rotating drum which is maintained at a temperature of approximately 170° C by injecting superheated steam at a pressure of about 100 p.s.i. thereinto. The sodium salt of HEDP is found to be a fine, free-flowing white powder.

Into a vertical stainless steel reactor column, 1 inch I.D. (inside diameter) and 12 inches long, containing a porous ceramic plate at the bottom portion thereof, and enclosed at both ends with the exception of a ½ inch inlet pipe in one end and a ½ inch exit pipe in the other end, is charged about 60 grams of the above-described sodium salt of HEDP. Nitrogen is utilized as the mobilizing gas and is passed into said reactor column via the ½ inch inlet pipe at a rate which gives 10 to 20 millimeter scale reading when using a ¼ inch stainless steel ball and which is equivalent to approximately 1 cubic foot per minute. The nitrogen gas is preheated by passing the gas through a copper coil tubing which is located in a heavy duty furnace. The temperature of the furnace is maintained at approximately 420° C. The temperature of the resulting fluidized sodium salt of HEDP is maintained at approximately 400° C as measured by a Chromel-Alumel thermocouple which is partially inserted into the reactor column. The aforementioned fluidized bed reactor, i.e., the stainless steel column, is also wrapped on the outside thereof with heating tape in order to maintain the desired pyrolysis temperature inside thereof. After approximately 4 and ½ hours, this heating operation is terminated and the resulting product is removed from the fluidized bed reactor and is cooled to room temperature and analyzed by nuclear magnetic resonance (NMR). The $P^{31}$ NMR and $H^1$ NMR analyses show that the resulting product is the tetrasodium salt of vinylidene diphosphonic acid which has the formula

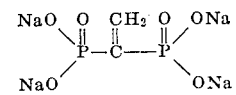

In order to demonstrate the criticality of the temperatures of the processes of the present invention, two separate 10-gram samples of the aforementioned sodium salt of HEDP are independently heated, respectively, at 250° C and 275° C for 24 hours in a forced-draft oven. (These samples are subjected via this type heating to substantially static conditions.) At the end of 24 hours, the resultant material is allowed to cool and the nuclear magnetic resonance analyses taken thereon. The $P^{31}$ and $H^1$ NMR analyses indicate that no sodium salt of vinylidene diphosphonate is formed in either one of the samples.

EXAMPLE II

The above Example I is repeated three separate times with the exception that the alkaline material initially utilized to prepare the salt of HEDP is respectively, potassium hydroxide, calcium hydroxide and magnesium hydroxide. The procedure set forth in Example I is utilized, and the resultant products are respectively the potassium, calcium and magnesium salts of vinylidene diphosphonate.

Into the fluidized bed reactor column described in Example I are charged 60 grams of anhydrous HEDP acid. The temperature of the fluidized bed is maintained at approximately 180° C for a period of 30 minutes. The resultant material is then cooled to room temperature and the nuclear magnetic resonance (NMR) analyses thereof show that the HEDP acid undergoes substantially complete decomposition to phosphorous and phosphoric acids.

The HEDP acid pyrolysis example set forth in the paragraph immediately above is repeated with the exception that at 10-minute intervals during the 30-minute heating period, samples of the fluidized bed were removed and the nuclear magnetic resonance analyses conducted thereon. These analytical tests show that there is no indication that the vinylidene diphosphonic acid is a stable intermediate in the decomposition of HEDP acid.

EXAMPLE III

In order to demonstrate the utility of vinylidene diphosphonate salt, the following procedure was carried out. Approximately one gram of the tetrasodium vinylidene diphosphonate prepared by the procedure disclosed in Example I is intimately admixed with 15 milliliters of a 2 percent solution of $Na_2CO_3$ and the resultant solution is neutralized to pH 11 with sodium hydroxide. This resultant solution is then titrated with calcium acetate containing approximately 25 milligrams per cc. until any turbidity appeared in the solution. At the appearance of turbidity, it is calculated that approximately 800 milligrams of calcium carbonate per gram of vinylidene diphosphonate salt is sequestered.

For comparative purposes, the above example is repeated with the exception that sodium tripolyphosphate is utilized as the sequestrant and it is found that only approximately 360 milligrams of calcium carbonate per gram of sodium tripolyphosphate is sequestered. In view of the above comparative test, then, it can readily be seen that vinylidene diphosphonate salt is an effective sequestering agent.

What is claimed is:

1. A process for preparing a vinylidene diphosphonate salt which comprises the steps of heating a salt of an acid having the formula

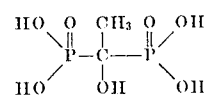

in a reaction zone which is maintained at a temperature of from about 300° C to about 500° C for a sufficient period of time to form said vinylidene diphosphonate salt, with the proviso that (1) the cationic portion of the salt is selected from the group consisting of ions of alkali metals, alkaline earth metals and ammonia, and (2) the molar ratio of the cationic portion of the salt to said acid is at least about 3:1, and (3) said salt is in the form of a fluidized bed in said reaction zone.

2. A process for preparing an alkali metal salt of vinylidine diphosphonic acid which comprises the steps of heating at a temperature of from about 350° C to about 425° C an alkali metal salt of 1-hydroxy, 1-ethylidene diphosphonic acid in a reaction zone for a sufficient period of time to form the alkali metal salt of vinylidine diphosphonic acid, with the proviso that (1) the molar ratio of the cationic portion of the alkali metal salt to said 1-hydroxy, 1-ethylidene diphosphonic acid is at least 3:1, and (2) the salt of 1-hydroxy, 1-ethylidene diphosphonic acid is in a fluidized bed form, and (3) said reaction zone contains an inert atmosphere.

3. The process as set forth in claim 2 wherein the alkali metal salt is a sodium salt of 1-hydroxy, 1-ethylidene diphosphonic acid and the end product is tetrasodium vinylidane diphosphonate.

4. A process for preparing an alkali metal salt of vinylidene diphosphonic acid which comprises the steps of heating at a temperature of from about 350° C to about 425° C an alkali metal salt of 1-hydroxy, 1-ethylidene diphosphonic acid in a reaction zone for a sufficient period of time to form the alkali metal salt of vinylidene diphosphonic acid, with the proviso that (1) the molar ratio of the cationic portion of the alkali metal salt to said 1-hydroxy, 1-ethylidene diphosphonic acid is at least 3:1, and (2) the heating is carried out in a reaction zone which is maintained at a pressure of from about 9/10 to about 1/10 atmospheres.

* * * * *